US007993768B2

(12) United States Patent
Vallance et al.

(10) Patent No.: US 7,993,768 B2
(45) **Date of Patent: *Aug. 9, 2011**

(54) ENERGY STORAGE DEVICE AND METHOD

(75) Inventors: Michael Alan Vallance, Loudonville, NY (US); Charles Dominic Iacovangelo, Saratoga Springs, NY (US); Hari Nadathur Seshadri, Karnataka (IN); Guruprasad Sundararajan, Karnataka (IN); David Charles Bogdan, Jr., Scotia, NY (US); Karthick Vilapakkam Gourishankar, Karnataka (IN); Daniel Scott Albert Lentz, League City, TX (US)

(73) Assignee: General Electric Company, Niskayuna, NY (US)

( * ) Notice: Subject to any disclaimer, the term of this patent is extended or adjusted under 35 U.S.C. 154(b) by 792 days.

This patent is subject to a terminal disclaimer.

(21) Appl. No.: 11/961,024

(22) Filed: Dec. 20, 2007

(65) Prior Publication Data

US 2009/0162736 A1 Jun. 25, 2009

(51) Int. Cl.

| | |
|---|---|
| ***H01M 2/38*** | (2006.01) |
| ***H01M 6/04*** | (2006.01) |
| ***H01M 4/00*** | (2006.01) |
| ***H01M 4/13*** | (2006.01) |

(52) U.S. Cl. ............ 429/50; 429/51; 429/188; 429/220; 429/229

(58) Field of Classification Search .................... 429/50, 429/199, 163

See application file for complete search history.

(56) References Cited

U.S. PATENT DOCUMENTS

| | | | | |
|---|---|---|---|---|
| 3,632,448 | A | 1/1972 | Beltzer | |
| 3,650,834 | A | 3/1972 | Buzzelli | |
| 4,063,005 | A | 12/1977 | Mamantov et al. | |
| 4,214,955 | A * | 7/1980 | Bowman | 205/377 |
| 4,214,956 | A * | 7/1980 | Bowman | 205/377 |
| 4,797,333 | A | 1/1989 | Coetzer et al. | |
| 4,846,943 | A | 7/1989 | Coetzer et al. | |
| 2008/0145749 | A1* | 6/2008 | Iacovangelo et al. | 429/130 |
| 2009/0233170 | A1* | 9/2009 | Iacovangelo et al. | 429/203 |

FOREIGN PATENT DOCUMENTS

| | | | |
|---|---|---|---|
| GB | 2056757 | A | 3/1981 |
| GB | 2159661 | A | 12/1985 |
| GB | 2230640 | A | 10/1990 |
| JP | 55030110 | A | 3/1980 |
| JP | 55039124 | A | 3/1980 |
| JP | 56096464 | A | 8/1981 |
| JP | 11040192 | A | 2/1999 |

OTHER PUBLICATIONS

PCT International Search Report dated Jan. 1, 2009.

Preethy Parthasarathy, Neill Weber, Anil V. Virkar; High Temperature Sodium—Zinc Chloride Batteries With Sodium Beta—Alumina Solid Electrolyte; Department of Materials Science and Engineering,University of Utah; Materials and Systems Research Incorporated; 1 Page.

* cited by examiner

*Primary Examiner* — Barbara L Gilliam
*Assistant Examiner* — Thomas Wallen
(74) *Attorney, Agent, or Firm* — Richard A. DeCristofaro

(57) ABSTRACT

A composition is provided that includes a ternary electrolyte having a melting point greater than about 150 degree Celsius. The ternary electrolyte includes an alkali metal halide, an aluminum halide and a zinc halide. The amount of the zinc halide present in the ternary electrolyte is greater than about 20 mole percent relative to an amount of the aluminum halide. An energy storage device including the composition is provided. A system and a method are also provided.

23 Claims, No Drawings

ENERGY STORAGE DEVICE AND METHOD

TECHNICAL FIELD

The invention includes embodiments that relate to a composition for a molten salt electrochemical cell. The invention includes embodiments that relate to an energy storage device that includes the composition. The invention includes embodiments that relate to a method of using the energy storage device.

DISCUSSION OF ART

Work has been done on rechargeable batteries using sodium as the negative electrode in a battery cell. Sodium has a standard reduction potential of −2.71 volts. Sodium is relatively low weight, non-toxic, abundant, and economically desirable in the form of sodium chloride. The sodium anode may be used in liquid form, and the melting point of sodium is 98 degrees Celsius. The liquid sodium negative electrode is separated from a positive electrode (cathode) by a sodium-ion conducting solid electrolyte. A second, molten electrolyte (such as sodium tetrachloroaluminate) is needed to allow the rapid transport of ions from and to the porous positive electrode, and to and from the solid electrolyte. The melting point of the molten electrolyte, along with the temperature-dependent, sodium-ion conductivity of the solid electrolyte, determines the minimum operating temperature of the battery. A cathode material should have good solubility in the molten electrolyte and good compatibility with the solid electrolyte in the charged (oxidized) state. Low solubility of the oxidized cathode material in the molten electrolyte can lead to passivation of the remaining uncharged (reduced) electrode surface and fouling of the pores. Passivation and fouling may reduce the amount of charging and utilization of the cathode material and the available discharge power.

It may be desirable to have a molten salt electrochemical cell that has different chemistry than those electrochemical cells that are currently available. It may be desirable to have an energy storage method that differs from those methods that are currently available. It may be desirable to have an energy storage device that differs from those devices that are currently available.

BRIEF DESCRIPTION

In accordance with an embodiment of the invention, a composition is provided that includes a ternary electrolyte having a melting point greater than about 150 degree Celsius. The ternary electrolyte includes an alkali metal halide, an aluminum halide and a zinc halide. The amount of the zinc halide present in the ternary electrolyte is greater than about 20 mole percent relative to an amount of the aluminum halide.

An energy storage device is provided in one embodiment of the invention. The energy storage device includes a housing. The housing has an interior surface defining a volume. The energy storage device further includes a separator having a first surface that defines at least a portion of a first chamber, and a second surface that defines a second chamber, and the first chamber is in ionic communication with the second chamber through the separator. The energy storage device further includes a cathodic material. The cathodic material is disposed within the first chamber and in ionic communication with the separator. Furthermore, the energy storage device includes a ternary electrolyte having a melting point greater than about 150 degree Celsius. The ternary electrolyte includes an alkali metal halide, an aluminum halide and a zinc halide. The amount of the zinc halide present in the ternary electrolyte is greater than about 20 mole percent relative to an amount of the aluminum halide. A system including the energy storage device is provided.

In accordance with an embodiment of the invention, a method of operating an energy storage device is provided in which the energy storage device operates at a temperature range of from about 350 degrees Celsius to about 500 degrees Celsius. The method further includes transportation of alkali metal ions between a first chamber and a second chamber through a separator. The separator is in ionic communication with a ternary electrolyte. The ternary electrolyte includes an alkali metal halide, an aluminum halide and a zinc halide. The amount of the zinc halide present in the ternary electrolyte is greater than about 20 mole percent relative to an amount of the aluminum halide.

DETAILED DESCRIPTION

The invention includes embodiments that relate to a composition for a molten salt electrochemical cell. The invention includes embodiments that relate to an energy storage device that includes the composition. The invention includes embodiments that relate to a method of using the energy storage device.

As used herein, cathodic material is the material that supplies electrons during charge and is present as part of the redox reaction as more than about 5 percent by weight of the participating electrochemical reactants on its side of the reaction. An electrolyte is a medium that provides the ion transport mechanism between the positive and negative electrodes of a cell. Additives that facilitate the ion transport mechanism, but do not themselves provide the mechanism, are distinguished from the electrolyte itself. Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

In accordance with an embodiment of the invention, a composition is provided that includes a ternary electrolyte. The ternary electrolyte includes an alkali metal halide, aluminum halide, and zinc halide. The alkali metal halide includes the alkali metal used as an anodic material in a molten salt electrochemical cell. Suitable material for the alkali metal may be selected from lithium, sodium or potassium. In one embodiment, the alkali metal is sodium.

The alkali metal halide and the zinc halide are present in an amount relative to the aluminum halide. The amount of the zinc halide present in the ternary electrolyte may be greater than about 20 mole percent relative to the amount of the aluminum halide. In one embodiment, the amount of the zinc halide in the ternary electrolyte may be in a range of from about 20 mole percent to about 25 mole percent, from about 25 mole percent to about 30 mole percent, from about 30 mole percent to about 40 mole percent, from about 40 mole percent to about 50 mole percent, from about 50 mole percent to about 60 mole percent, from about 60 mole percent to about 70 mole percent, from about 70 mole percent to about 90 mole percent, from about 90 mole percent to about 100 mole percent, from about 100 mole percent to about 120 mole percent, from about 120 mole percent to about 135 mole percent, from about 135 mole percent to about 145 mole percent, from about 155 mole percent to about 155 mole percent, from about 175 mole percent to about 185 mole percent, from about 185 mole percent to about 195 mole percent, or from about 195 mole percent to about 205 mole percent relative to the amount of the aluminum halide. It should be noted that 20 mole percent of zinc halide is greater than about 20 weight percent zinc halide.

In addition to the alkali metal halide and the zinc halide, the balance of the ternary electrolyte is aluminum halide. With regard to the halide portion, each of the halides of the ternary electrolyte may have a common halide, such as chloride. Alternately, the common halide may include bromide, iodide or fluoride. In one embodiment, the halide may include chloride and one or more additional halides. If a second or additional halide is present, then relative to the common halide the amount of additional halide may be greater than about 0.1 mole percent of the total halide concentration. In one embodiment, the additional halide amount is in range of from about 0.1 mole percent to about 0.5 mole percent, from about 0.5 mole percent to about 1 mole percent, from about 1 mole percent to about 5 mole percent, or from about 5 mole percent to about 10 mole percent.

The composition of the ternary electrolyte may include the three electrolyte salts in a molar ratio relative to each other. The molar ratio of the alkali metal halide, the aluminum halide and the zinc halide in the ternary electrolyte may be given as 1+x:1:y, respectively. The molar amount of the alkali metal halide may be at least equal to the amount of aluminum halide at all states of charge for an electrochemical cell. The value of x may be greater than about 0.1. In one embodiment, the value of x may be in a range of from about 0.1 to about 1, from about 1 to about 2, from about 2 to about 4, from about 4 to about 6, from about 6 to about 8, or from about 8 to about 10. The ternary electrolyte may be in the form of a single liquid phase, a single liquid phase coexisting with a solid phase, a plurality liquid phases, a plurality of liquid phases coexisting with a solid phase, or a plurality of liquid phases coexisting with a plurality of solid phases.

The value of y refers to the relative amount of the zinc halide in the ternary electrolyte. The zinc halide may enhance the compatibility of the molten ternary electrolyte with a cathode material. The zinc halide may enhance the compatibility of the molten ternary electrolyte with the separator to provide relatively high conductivity of an alkali metal ion through the separator during use. The value of y may be greater than about 0.2. In one embodiment, the value of y may be in range of from about 0.2 to about 0.3, from about 0.3 to about 0.4, from about 0.4 to about 0.5, from about 0.5 to about 0.6, from about 0.6 to about 0.7, from about 0.7 to about 0.8, from about 0.8 to about 0.9, from about 0.9 to about 1, from about 1 to 1.1, from about 1.1 to about 1.2, from about 1.2 to about 1.3, from about 1.3 to about 1.4, or from about 1.4 to about 1.5.

The performance of an electrochemical cell having the ternary electrolyte may depend on such factors as the ratio of the three electrolytes relative to each other, and to an operating temperature. A suitable ratio of the three electrolytes within the ternary electrolyte coupled with a particular operating temperature of the electrochemical cell may lead to an unexpectedly high power, capacity and efficiency of the electrochemical system. The ratio of the three electrolytes may be selected to increase the ability of the ternary electrolyte to wet out the cathode and/or a surface of the separator. The ratio may be selected to increase the compatibility of the ternary electrolyte with the cathode material. The ratio may be selected to increase the compatibility of the ternary electrolyte with the separator. A suitable molar ratio of the alkali metal halide, the aluminum halide, and the zinc halide may be 1+x:1:y, where x may decide the relative amount of the alkali metal halide and y may represent the relative amount of the zinc halide in the ternary electrolyte. In one embodiment, being normalized against the aluminum halide, the value of x is within a range of from about 2 to about 4 and the value y is within a range of from about 0.2 to about 1.5. Subsets of that ratio for the value of y may include y being in a range of from about 0.3 to about 0.4, or from about 0.4 to about 0.5, from about 0.5 to about 0.6, from about 0.6 to about 0.7, from about 0.7 to about 0.8, from about 0.8 to about 0.9, from about 0.9 to about 1.0, from about 1.0 to about 1.1, from about 1.1 to about 1.2, from about 1.2 to about 1.3, or from about 1.3 to about 1.4. The ranges listed here can provide a high power, high capacity, and high efficiency electrochemical cell.

The ternary electrolyte has a nominal average melting point of about 150 degree Celsius. Suitable operating temperature for the electrochemical cell having the ternary electrolyte may be greater than about 350 degrees Celsius. At lower operating temperature, below 350 degrees Celsius, the cell (ternary electrolyte) may have higher electrical resistance. The higher electrical resistance may be due to a second phase formed in the ternary electrolyte. At higher operating temperature above 500 degrees Celsius, a cathode material may melt. In one embodiment, the operating temperature may be in a range of from about 350 degrees Celsius to about 360 degrees Celsius, from about 360 degrees Celsius to about 375 degrees Celsius, from about 375 degrees Celsius to about 380 degrees Celsius, from about 380 degrees Celsius to about 390 degrees Celsius, from about 390 degrees Celsius to about 400 degrees Celsius, from about 400 degrees Celsius to about 410 degrees Celsius, or from about 410 degrees Celsius to about 420 degrees Celsius.

In accordance with an embodiment of the invention, an energy storage device is provided that includes a housing having an interior surface defining a volume. A separator is disposed in the volume. The separator has a first surface that defines at least a portion of a first chamber, and a second surface that defines a second chamber, and the first chamber is in ionic communication with the second chamber through the separator. The energy storage device further includes a cathodic material. The cathodic material is disposed within the first chamber. Furthermore, the energy storage device includes a ternary electrolyte having a melting point greater than about 150 degree Celsius. The ternary electrolyte includes alkali metal halide, aluminum halide and zinc halide. The amount of the zinc halide present in the ternary electrolyte is in a range from about 20 weight percent to about 80 weight percent relative to an amount of the aluminum halide.

The housing can be sized and shaped to have a cross-sectional profile that is square, polygonal, or circular; and can have a length to width ratio that is greater than about 1:10. In one embodiment, the length to width ratio is in a range of from about 1:10 to about 1:5, from about 1:5 to about 1:1, from about 1:1 to about 5:1, from about 5:1 to about 10:1, from about 10:1 to about 15:1. The housing can be formed from a material that is a metal, ceramic, or a composite; the metal can be selected from nickel or steel, the ceramic can be a metal oxide.

As noted above, the separator is disposed within the volume of the housing. The separator may have a cross-sectional profile normal to the axis that is a circle, a triangle, a square, a cross, or a star. Alternatively, the separator can be about planar. A planar configuration (or with a slight dome) may be useful in a prismatic or button-type battery configuration, where the separator is domed or dimpled. Similarly, the separator can be flat or undulate.

The separator is an alkali metal ion conductor solid electrolyte that conducts alkali metal ions during use. Suitable materials for the separators may include an alkali-metal-beta'-alumina, alkali-metal-beta"-alumina, alkali-metal-beta'-gallate, or alkali-metal-beta"-gallate. In one embodiment, the separator includes a beta alumina. In one embodiment, a portion of the separator is alpha alumina and another portion of the separator is beta alumina. The alpha alumina may be relatively more amenable to bonding (e.g., compression bonding) than beta alumina, and may help with sealing and/or fabrication of the energy storage device.

The separator may be stabilized by the addition of small amounts of, but not limited to lithia, magnesia, zinc oxide, yttria or similar oxides. These stabilizers may be used alone or in combination with themselves or with other materials. The separator, sometimes referred to as beta alumina separator electrolyte (BASE) may include one or more dopant. Suitable dopants may include oxide of a transition metal selected from iron, nickel, copper, chromium, manganese, cobalt, or molybdenum. A separator having the dopants is referred to as beta"alumina separator electrolyte, and has higher sodium ion conductivity than beta alumina. Sodium ion conductivity of one form of beta"alumina separator electrolyte at 300 degrees Celsius is in a range of from about 0.2 $ohm^{-1}\ cm^{-1}$ to about 0.4 $ohm^{-1}\ cm^{-1}$.

The amount of the stabilizer to the beta"alumina can be greater than 0.5 weight percent. In one embodiment, the amount is in a range of from about 0.5 weight percent to about 1 weight percent, from about 1 weight percent to about 2 weight percent, from about 2 weight percent to about 3 weight percent, from about 3 weight percent to about 4 weight percent, from about 4 weight percent to about 5 weight percent, from about 5 weight percent to about 10 weight percent, from about 10 weight percent to about 15 weight percent, from about 15 weight percent to about 20 weight percent, or greater than about 20 weight percent based on the total weight of the beta"alumina material.

The separator can be a tubular container in one embodiment having at least one wall. The wall can have a thickness; and an ionic conductivity and the resistance across the wall may depend in part on the thickness. Suitable thickness can be less than 5 millimeters. In one embodiment, the thickness is in a range of from about 5 millimeters to about 4 millimeters, from about 4 millimeters to about 3 millimeters, from about 3 millimeters to about 2 millimeters, from about 2 millimeters to about 1.5 millimeters, from about 1.5 millimeters to about 1.25 millimeters, from about 1.25 millimeters to about 1.1 millimeters, from about 1.1 millimeters to about 1 millimeter, from about 1 millimeter to about 0.75 millimeters, from about 0.75 millimeters to about 0.6 millimeters, from about 0.6 millimeters to about 0.5 millimeters, from about 0.5 millimeters to about 0.4 millimeters, from about 0.4 millimeters to about 0.3 millimeters, or less than about 0.3 millimeters.

A cation facilitator material can be disposed on at least one surface of the separator, in one embodiment. The cation facilitator material may include, for example, selenium. At least one separator surface has a surface roughness RMS in a range of greater than about 10 nanometers. In one embodiment, the surface roughness RMS is in range of from about 10 nanometers to about 20 nanometers, from about 20 nanometers to about 30 nanometers, from about 30 nanometers to about 40 nanometers, from about 40 nanometers to about 50 nanometers, from about 50 nanometers to about 60 nanometers, from about 60 nanometers to about 70 nanometers, from about 70 nanometers to about 80 nanometers, from about 80 nanometers to about 90 nanometers, from about 90 nanometers to about 100 nanometers. In another embodiment, an alkali metal ion wicking material may abut the surface of the separator.

Optionally, one or more shim structures can be disposed with the volume. The shim structures support the separator within the volume of the housing. The shim structures can protect the separator from vibrations caused by motion of the cell during use and thus reduce or eliminate movement of the separator relative to the housing. If present, the shim structures may function as a current collector to the housing. Utilization of the shim structures as a current collector may be useful if the molten anode level rises and falls during charge and discharge. The shim structures may provide a thin gap adjacent to the separator to facilitate wicking of a thin layer of molten anodic material against a surface of the separator. This wicking may be independent of the state of charge of the battery, and independent of the head height of anodic material.

The separator can seal to an inner surface of the housing by a sealing structure. The sealing structure can be of a glassy composition. The sealing structure is operable to maintain a seal between the contents and the environment at a temperature greater than about 100 degrees Celsius. In one embodiment, the operating temperature range is from about 100 degrees Celsius to about 200 degrees Celsius, from about 200 degrees Celsius to about 300 degrees Celsius, from about 300 degrees Celsius to 400 degrees Celsius, from about 400 degrees Celsius to about 500 degrees Celsius, from about 500 degrees Celsius to about 600 degrees Celsius. The separator may not etch or pit in the presence of a halogen and the anodic material.

Suitable glassy sealing compositions may include, but are not limited to phosphates, silicates, borates, germinates, vanadates, zirconates, arsenates, and their various forms, for example, borosilicates, alumino silicate, calcium silicate, binary alkali silicates, alkali borates, or a combination of two or more thereof. Alternatively, the end portions of the separator may include alpha alumina. The alpha alumina can be bonded directly to the lid that encloses the second chamber. Suitable bonding methods may include thermal compression bonding, diffusion bonding, or thin film metallizing, each of these may be used in conjunction with welding or brazing techniques.

The separator may have a first surface and a second surface. The first surface may define a portion of a first chamber and the second surface may define a second chamber. The first chamber may be in ionic communication with the second chamber through the separator.

The ionic material transported across the separator between the anode compartment and the cathode compartment is an alkali metal in one embodiment. Suitable ionic material may include one or more of sodium, lithium and potassium. The anodic material is molten during use. The first chamber may receive and store a reservoir of anodic material. Additives suitable for use in the anodic material may include a metal oxygen scavenger. Suitable metal oxygen scavengers may include one or more of manganese, vanadium, zirconium, aluminum, or titanium. Other useful additives may include materials that increase wetting of the separator surface by the molten anodic material. Additionally, some additives may enhance the contact or wetting of the separator with regard to the current collector, to ensure substantially uniform current flow throughout the separator.

Other additives may affect performance. Such performance additives may increase ionic conductivity, increase or decrease solubility of the charged cathodic species, reduce vapor pressure over the electrode, improve wetting of the solid electrolyte by the molten electrolyte, or prevent ripening of the cathode microdomains, to name several utilities. In one embodiment, the additive may be present in an amount that is less than about 5 mole percent compared to the total combined moles of alkali metal halide, aluminum halide and zinc halide.

The second chamber may contain a cathodic material. The cathodic material may exist in elemental form or as a salt depending on a state of charge. That is, the cathodic material presents in elemental form and/or salt form and the ratio of the weight percent of the first cathodic material in elemental form to the weight percent of the salt form may be based on the state of charge. Suitable materials for use as the cathodic material may include aluminum, nickel, zinc, copper, chromium, tin, arsenic, tungsten, molybdenum, and iron. In one embodiment, the cathodic material consists essentially of only one of zinc, nickel, copper, or chromium. In one embodiment, the cathodic material consists essentially of zinc. In one embodiment, the cathodic material may include two or more of metals selected from aluminum, nickel, zinc, copper, chromium, tin, arsenic, tungsten, molybdenum, and iron.

In one embodiment, the cathodic material consists essentially of only two of cathodic materials, a first cathodic material and a second cathodic material. The first cathodic material may include aluminum, nickel, zinc, copper, chromium, and iron. The second cathodic material is different from the first cathodic material and may include aluminum, nickel, zinc, copper, chromium, and iron. Other suitable second cathodic material may include tin and/or arsenic. Other suitable second cathodic materials may include tungsten, titanium, niobium, molybdenum, tantalum, and vanadium. The first cathodic material may be present relative to the second metals by a ratio in that is less than about 100:1. In one embodiment, the first cathodic material may be present relative to the additive metals by a ratio that is in a range from about 100:1 to about 50:1, from about 50:1 to about 1:1, or from about 1:1 to about 1:50, from about 1:50 to about 1:95.

The cathodic material can be self-supporting or liquid/molten, but in one embodiment the cathodic material is disposed on an electronically conductive support structure. The support structure may be a foam, a mesh, a weave, a felt, or a plurality of packed particles, fibers, whiskers. In one embodiment, a suitable support structure may be formed from carbon. A suitable carbon form is reticulated foam. A support structure may be formed from a metal.

The cathodic material can be secured to an outer surface of the support structure. The support structure can have a high surface area. The cathodic material on the support structure may be adjacent to the first surface of the separator and extend away from that separator surface. The support structure can extend away from the first surface to a thickness that is greater than about 0.01 millimeters. In one embodiment, the thickness is in a range of from about 0.01 millimeters to about 0.1 millimeter, from about 0.1 millimeters to about 1 millimeter, from about 1 millimeter to about 5 millimeters, from about 5 millimeters to about 10 millimeters, from about 10 millimeters to about 15 millimeters, from about 15 millimeters to about 20 millimeters. For larger capacity electrochemical cell, the thickness may be larger than 20 millimeters.

By placing the cathodic material on the support structure surface, rather than in the second chamber as a liquid melt, the homogeneity of the liquid can be avoided. That is, the placement on the support allows for the ability to locate specific materials within the electrochemical cell. For example, a concentration of the first cathodic material in elemental form may differ from a point nearer the separator relative to a point further from the separator. Like an onion, there can be layers of the first cathodic material being present in different concentrations or amounts depending on where located inside the electrochemical cell. Similarly, a gradient can be formed to address, for example, electrical resistivity rise or to provide a more constant availability of reactant as the reaction front area changes as it is used and advances into the cell body away from the separator surface. A gradient, as used herein, can include a concentration step change, and as such can be configured to function as a state of charge indicator.

A sulfur or a phosphorous-containing additive may be disposed in the cathodic material. In presence of sulfur or phosphorous in the cathode prevents recrystallization of salts and grain growth. For example, elemental sulfur, sodium sulfide or triphenyl sulfide may be disposed in the cathode.

The energy storage device may have a plurality of current collectors including anode current collectors and cathode current collectors. The anode current collector is in electrical communication with the first chamber and the cathode current collector is in electrical communication with the contents of the second chamber. Suitable materials for the anode current collector may include Ti, Ni, Cu, Fe, or combinations of two or more thereof. Other suitable materials for the anode current collector may include steel or stainless steel. Still other suitable materials for the anode current collector may include carbon. The current collector may be plated or clad. The cathode current collector may be a wire, paddle or mesh formed from Pt, Pd, Au, Ni, Cu, C, or Ti. The plurality of current collectors can have thickness greater than 1 millimeter (mm). In one embodiment, the thickness is in a range of from about 1 millimeter to about 10 millimeters, from about 10 millimeters to about 20 millimeters, from about 20 millimeters to about 30 millimeters, from about 30 millimeters to about 40 millimeters, or from about 40 millimeters to about to about 50 millimeters. Cladding on the current collector, if present, may coat the current collector to a thickness greater than about 1 μm. In one embodiment, the cladding thickness is in a range of from about 1 micrometer (μm) to about 10 μm, from about 10 μm to about 20 μm, from about 20 μm to about 30 μm, from about 30 μm to about 40 μm, or from about 40 μm to about to about 50 μm.

Furthermore, the energy storage device includes the composition of the ternary electrolyte. The ternary electrolyte may be disposed within the second chamber defined by the separator. The ternary electrolyte includes an alkali metal halide, an aluminum halide and a zinc halide. The amount of the zinc halide present in the ternary electrolyte is in a range of from about 5 mole percent (about 20 weight percent) to about 200 mole percent (about 80 weight percent) relative to an amount of the aluminum halide. The ternary electrolyte may not infiltrate zinc ions from the zinc halide into the separator during use, where such infiltration is undesirable. That is, the ternary electrolyte may be compatible with the cathode material and the separator and thus may allow the rapid transport of ions from and to the cathodic material to and from the separator. That is, the ternary electrolyte may provide less ionic resistivity for alkali metal ions. Thus, use of the ternary electrolyte may provide high power and high efficiency electrochemical cell.

The ternary electrolyte may have an ionic resistivity for alkali metal ions that is greater than about 1.0 ohm-centimeter. In one embodiment, the ternary electrolyte may have ionic resistivity for alkali metal ions that is in a range of from about 1.0 ohm-centimeter to about 1.5 ohm-centimeter, from about 1.5 ohm-centimeter to about 1.6 ohm-centimeter, from about 1.6 ohm-centimeter to about 1.7 ohm-centimeter, from about 1.7 ohm-centimeter to about 1.8 ohm-centimeter, from about 1.8 ohm-centimeter to about 1.9 ohm-centimeter, from about 1.9 ohm-centimeter to about 2.0 ohm-centimeter, or from about 2.0 ohm-centimeter to about 2.5 ohm-centimeter.

The device may be an electrochemical cell. The electrochemical cell may be assembled in the discharged state. Applying a voltage between the anode and the cathode of the electrochemical cell and reversing the electrochemical reaction may charge the electrochemical cell. In one embodiment, sodium chloride in the cathode dissolves to form sodium ions and chloride ions during charging. Sodium ions, under the influence of applied electrical potential, conduct through the separator and combine with electrons from the external circuit to form the sodium electrode and chloride ions react with the cathodic material to form metal chloride and donate electrons back to external circuit. During discharge, sodium ions conduct back through the separator reversing the reaction, and generating electrons. The cell reaction is as follows:

$$n\mathrm{NaCl}+\mathrm{M}\leftrightarrow\mathrm{MCl}_n+n\mathrm{Na}^{+}+ne^{-}$$

A plurality of the electrochemical cells can be organized into an energy storage system. Multiple cells can be connected in series or parallel to form a stack. The ratings for the power and energy of the stack may depend on such factors as the number of cells in the stack. Other factors may be based on end-use application specific criteria.

Various embodiments of the energy storage device can store an amount of energy that is in a range of from about 0.1 kiloWatt hours (kWh) to about 100 kWh. One embodiment of the energy storage device has an energy-by-weight ratio of greater than 100 Watt-Hours/kilogram, and/or an energy-by-volume ratio of greater than 160 Watt-Hours/liter. Another embodiment of the energy storage device has a specific power rating of greater than 150 Watts/kilogram.

Suitable energy storage devices may have an application specific Power to Energy ratio of less than 10 to 1 hour 1. In one embodiment, the specific power to energy ratio is in range from about 1:1 to about 2:1, from about 2:1 to about 4:1, from about 4:1 to about 6:1, from about 6:1 to about 8:1, or from about 8:1 to about 10:1. In other embodiments, the power to energy ratio is in range from about 1:1 to about 1:2, from about 1:2 to about 1:4, from about 1:4 to about 1:6, from about 1:6 to about 1:8, or from about 1:8 to about 1:10.

In one embodiment of the energy storage system, a controller communicates with the plurality of the cells. The controller can distribute an electrical load to select cells in a cell stack in response to feedback signals indicated states for each of the cells in the cell stack. The controller is operable to perform a re-warm method in which a series of heating elements are activated in a sequence to melt a frozen portion of the energy storage device. In another embodiment, the controller may distribute an electrical load to select cathodic materials at determined locations within individual cells.

A suitable controller can be a proportional-integral-derivative controller (PID controller). The controller can measure a value from a process or other apparatus and compare it with a reference setpoint value. The difference (or "error" signal) may be used to adjust some input to the process in order to bring the process-measured value back to its desired setpoint.

If present, a heat management device maintains the temperature of the energy storage device. The heat management device can warm the energy storage device if too cold, and can cool the energy storage device if too warm. The heat management system includes a thaw profile that can maintain a minimal heat level in the first and second chambers to avoid a freeze of cell reagents.

Another embodiment of the invention provides an energy management system that includes a second energy storage device that differs from the energy storage device. This duel energy storage device system can address the ratio of power to energy in that a first energy storage device can be optimized for efficient energy storage, and a second energy storage device can be optimized for power delivery. The control system can draw from either energy storage device as needed, and charge back either energy storage device that needs such a charge.

Suitable second energy storage devices, for the power piece, include a primary battery, a secondary battery, a fuel cell, or an ultracapacitor. A suitable secondary battery may be a lithium battery, lithium ion battery, lithium polymer battery, or a nickel metal hydride battery.

EXAMPLES

The following examples illustrate methods and embodiments in accordance with the invention, and as such do not limit the claims. Unless specified otherwise, all ingredients are commercially available from such common chemical suppliers as Alpha Aesar, Inc. (Ward Hill, Mass.), Spectrum Chemical Mfg. Corp. (Gardena, Calif.), and the like.

Example 1

Preparation of Ternary Electrolyte Composition

Mixtures of sodium chloride, aluminum chloride, and zinc chloride are prepared. A series of samples are formed in which the mole ratio, respectively, of sodium chloride, aluminum chloride and zinc chloride in the samples are 1) 4:1:0.2; 2) 4:1:0.5; 3) 4:1:1; and 4) 4:1:2.

Four separator tubes, cylindrical in shape, are produced according to known methods or are commercially obtained. Each tube is ceramic sodium conductive beta" alumina. The cylinder dimensions are 228 mm length, 36 mm internal diameter, and 38 mm outside diameter. Each ceramic separator tube is glass sealed to an alpha alumina collar to form an assembly. Each assembly is placed in a stainless steel can that is the housing to form an electrochemical cell. The can size is about 38 mm×38 mm×230 mm.

Zinc coated open-cell vitreous carbon foam is used as the cathodic material. The cathodic material is disposed in the volume of the housing, and within the separator tube, and functions as the working electrode. The carbon foam functions as a current collector and is electrical connected to leads allowing that to happen. The housing can functions as a second current collector.

During operation, the Samples 1-4 in corresponding Cells 1-4 are heated to an operating temperature of 350 degrees Celsius. During the temperature ramp to the operating temperature, the melt point of the Samples 1-4 is achieved and each Sample melts to form the corresponding ternary electrolyte composition.

Example 2

Preparation of Ternary Electrolyte Test Cells

Samples 5-8 are created and formed in correspond test Cells 5-8, the molar ratios of Samples 5-8 are correspondingly the same as Samples 1-4 as described in Example 1. The difference being that instead of the cathodic material being zinc disposed on carbon foam, instead the cathodic material a dry mix of granulated zinc metal, sodium chloride, and a electrically conductive support material. A rod shaped molybdenum-based current collector is disposed in the ceramic separator. The dry granulated mix is dry mixed with zinc chloride and aluminum chloride to form four fill batches. Each of the four fill batches is added into a ceramic separator around the current collector.

Each current collector has external wire ends. The external wire ends are connected to a computer-interfaced galvanostat (PARSTAT 2273 available from AMETEK Princeton Applied Research (Oak Ridge, Tenn.) and constant current data are measured. The temperature of each of the four formed electrochemical cells is increased at a controlled rate (5 degrees Celsius per minute) through the melt temperature of the ternary electrolyte precursors, and up to an operating temperature of 375 degrees Celsius. The ternary electrolyte forms in situ.

Open-circuit potential relative to Na is measured as 1.9 volts. The charging voltage is 2.2 volts and the discharge voltage is 1.8 volts. Results show acceptable stability of the separator, a low electrical resistance rise, and little or no grain ripening. That is, the cells perform desirably.

In the following specification and the clauses which follow, reference will be made to a number of terms have the following meanings. The singular forms “a”, “an” and “the” include plural referents unless the context clearly dictates otherwise. Approximating language, as used herein throughout the specification and clauses, may be applied to modify any quantitative representation that could permissibly vary without resulting in a change in the basic function to which it is related. Accordingly, a value modified by a term such as “about” is not to be limited to the precise value specified. In some instances, the approximating language may correspond to the precision of an instrument for measuring the value. Similarly, “free” may be used in combination with a term, and may include an insubstantial number, or trace amounts, while still being considered free of the modified term.

As used herein, the terms “may” and “may be” indicate a possibility of an occurrence within a set of circumstances; a possession of a specified property, characteristic or function; and/or qualify another verb by expressing one or more of an ability, capability, or possibility associated with the qualified verb. Accordingly, usage of “may” and “may be” indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity can not occur—this distinction is captured by the terms “may” and “may be”.

The foregoing examples are illustrative of some features of the invention. The appended clauses are intended to clause the invention as broadly as has been conceived and the examples herein presented are illustrative of selected embodiments from a manifold of all possible embodiments. Accordingly, it is Applicants’ intention that the appended clauses not limit to the illustrated features of the invention by the choice of examples utilized. As used in the clauses, the word “comprises” and its grammatical variants logically also subtend and include phrases of varying and differing extent such as for example, but not limited thereto, “consisting essentially of” and “consisting of.” Where necessary, ranges have been supplied, and those ranges are inclusive of all sub-ranges there between. It is to be expected that variations in these ranges will suggest themselves to a practitioner having ordinary skill in the art and, where not already dedicated to the public, the appended clauses should cover those variations. Advances in science and technology may make equivalents and substitutions possible that are not now contemplated by reason of the imprecision of language; these variations should be covered by the appended clauses.

What is claimed is:

1. An energy storage device, comprising:

a housing having an interior surface defining a volume;

a separator disposed in the volume and having a first surface that defines at least a portion of a first chamber, and a second surface that defines a second chamber, and the first chamber is in ionic communication with the second chamber through the separator; and a cathodic material in ionic communication with the separator and disposed within the second chamber; and a ternary electrolyte in ionic communication with the cathodic material and the separator, the ternary electrolyte comprising alkali metal halide, aluminum halide, and zinc halide, and the zinc halide is present in an amount that is greater tha about 20 mole percent relative to an amount of the aluminum halide when the energy storage device is in a fully charged state.

2. The energy storage device as defined as in claim 1, wherein the cathodic material comprises at least one of zinc, copper, iron, or nickel.

3. The energy storage device as defined as in claim 1, wherein the cathodic material consists essentially of zinc, copper, or zinc and copper.

4. The energy storage device as defined as in claim 1, wherein the cathodic material consists essentially of zinc.

5. The energy storage device as defined in claim 1, wherein the cathodic material comprises two or more metals selected from the group consisting of nickel, zinc, copper, and iron.

6. The energy storage device as defined in claim 1, wherein the cathodic material further comprises one or more of chromium, tin, or antimony.

7. The energy storage device as defined in claim 1, wherein the separator is an alkali-metal-ion conductor and comprises at least one of alkali-metal-beta'-alumina, alkali-metal-beta"-alumina, alkali-metal-beta'-gallate, or alkali-metal-beta"-gallate.

8. The energy storage device as defined in claim 1, wherein the separator is resistant to infiltration of zinc ions from the zinc halide into the separator.

9. The energy storage device as defined in claim 1, further comprising a wicking current collector that is wet out by the ternary electrolyte.

10. An energy storage system comprising an energy storage device as defined in claim 1.

11. The energy storage system as defined in claim 10, further comprising a battery management controller configured to operate the system at a temperature in a range of from about 350 degree Centigrade to about 500 degree Centigrade.

12. The energy storage system as defined in claim 10, wherein the energy storage device has a Power-to-Energy ratio in a range of from about 1 (hour-1) to about 10 (hour-1).

13. The energy storage device as defined in claim 1, wherein the alkali metal halide comprises at least one of lithium, sodium, or potassium.

14. The energy storage device as defined in claim 1, wherein the alkali metal halide comprises at least one of chlorine, fluorine, or iodine.

15. The energy storage device as defined in claim 1, wherein the alkali metal halide, the aluminum halide and the zinc halide, each comprise a common halide selected from the group consisting of chlorine, fluorine, bromine, and iodine.

16. The energy storage device as defined in claim 15, wherein the common halide is chloride.

17. The energy storage device as defined in claim 1, further comprising an additive selected from the group consisting of sulfide, iodide or fluoride.

18. The energy storage device as defined in claim 1, wherein the alkali metal halide, the aluminum halide, and the zinc halide are present in a molar ratio 1+x:1:y, respectively, where x is in a range of from about 0.1 to about 10 and y is in a range of from about 0.2 to about 2.0.

19. The energy storage device as defined in claim 18, wherein the alkali metal halide, the aluminum halide, and the zinc halide are present in a molar ratio 1+x:1:y, respectively, where x is in a range of from about 0.1 to about 10 and y is in a range of from about 0.2 to about 0.75.

20. The energy storage device as defined in claim 18, wherein the alkali metal halide, the aluminum halide, and the zinc halide are present in a ratio 1+x:1:y, respectively, where x is in a range of from about 0.1 to about 10 and y is in a range of from about 0.75 to about 1.

21. The energy storage device as defined in claim 18, wherein the alkali metal halide, the aluminum halide, and the zinc halide are present in a ratio 1+x:1:y, respectively, where x is in a range of from about 0.1 to about 10 and y is in a range of from about 1 to about 2.

22. The energy storage device as defined in claim 1, wherein the ionic resistivity of the ternary electrolyte at a temperature in a range of from about 350 degrees Celsius to about 500 degrees Celsius is about 1.6 ohm centimeter.

23. A method, comprising:

operating an energy storage device at a temperature in a range of from about 350 degrees Celsius to about 500 degrees Celsius;

transporting metal ions between a first chamber and a second chamber through a separator that is in ionic communication with a ternary electrolyte comprising an alkali metal halide, an aluminum halide and a zinc halide, wherein amount of the zinc halide is greater than about 20 mole percent relative to the aluminum halide.

* * * * *

UNITED STATES PATENT AND TRADEMARK OFFICE

CERTIFICATE OF CORRECTION

PATENT NO. : 7,993,768 B2
APPLICATION NO. : 11/961024
DATED : August 9, 2011
INVENTOR(S) : Vallance et al.

It is certified that error appears in the above-identified patent and that said Letters Patent is hereby corrected as shown below:

In Column 9, Line 34, delete "1 hour 1." and insert -- 1 hour$^{-1}$. --, therefor.

In Column 12, Line 19, in Claim 1, delete "tha" and insert -- than --, therefor.

In Column 12, Line 55, in Claim 12, delete "(hour-1) to about 10 (hour-1)." and insert -- (hour$^{-1}$) to about 10 (hour$^{-1}$). --, therefor.

Signed and Sealed this
Twenty-first Day of February, 2012

David J. Kappos
*Director of the United States Patent and Trademark Office*